Nov. 1, 1932.        I. E. DUGAN        1,885,692
RECORD CONTAINER FOR MOTOR VEHICLES
Filed Oct. 27, 1930

INVENTOR
Ira E. Dugan

BY
Thos. E. Scofield
ATTORNEY

Patented Nov. 1, 1932

1,885,692

UNITED STATES PATENT OFFICE

IRA E. DUGAN, OF PONCA CITY, OKLAHOMA

RECORD CONTAINER FOR MOTOR VEHICLES

Application filed October 27, 1930. Serial No. 491,357.

This invention relates to improvements in theft-resisting identification record containers for motor vehicles, and refers more particularly to a container locked within an armoring vessel for holding identification records or valuable papers of any kind.

The novelty rests primarily in the fastening or attaching of the armoring pipe-like vessel into the body of an automobile, aeroplane or any other type of vehicle, to prevent the loss of valuable papers or records.

Figure 1:
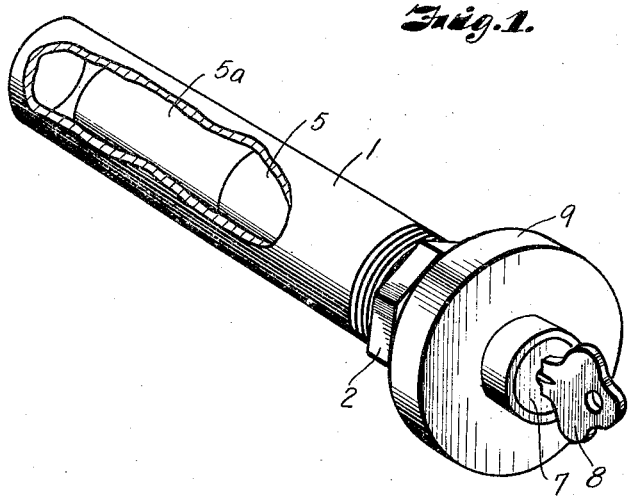
Fig. 1 is a perspective view of the device, showing the mounting thereof.
Figure 2:
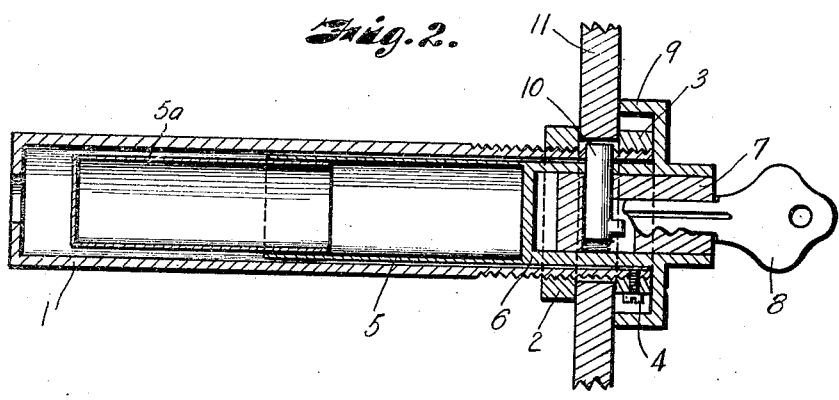
Fig. 2 is a sectional view of the device, showing the mounting thereof.

Referring to the drawing, at 1 is shown an armoring vessel which is preferably threaded at one end to receive the lock nut 2 and threaded collar 3. A set screw 4 is threaded in the collar and fits into a hole in the armoring vessel 1 to hold the collar against rotation. Within the armoring vessel is a container which is preferably in two parts, designated as 5 and 5a. This container may be opened by pulling apart the end pieces at the slip joint near its center. On the portion 5 is mounted, preferably by welding, a lock casing 6 in which is a lock cylinder 7 operated by means of a key 8. The lock casing has an enlarged flange 9 which extends over the collar 3. The armoring casing or vessel 1 has a locking hole drilled through the threaded portion to receive the lock plunger 10.

The container or armoring vessel 1 is mounted in any desired position in the vehicle, such as on the dash, on the rear cowling or in the body of the car at any point, by drilling a hole through the wall 11 in which it is mounted, sufficiently large to receive the armoring vessel 1. The wall shown at 11 may be any part of the vehicle, the container portion of the armoring vessel extending back into the body of the vehicle, while the exposed lock is substantially flush with the surface of the wall or body of the vehicle.

The lock nut is drawn up against the wall 11 so as to hold the vessel rigidly in position at which time the flange 9 will contact the wall and prevent disengagement of the collar 3 or removal of the device except by unlocking and removal of the inner container.

The arrangement of the lock nut and collar together with the flange arrangement of the lock casing provides a construction which is simple and inexpensive to manufacture and, besides being rugged, is theft-resisting.

The device is particularly adapted, as suggested for carrying identification records in motor vehicles.

The container is also useful for physicians, as it can be used as a receptacle for safe keeping of narcotics. A vial may easily be slipped into the container and the container securely locked within the armored vessel.

I claim as my invention:

1. A record container for automotive vehicles, comprising an armoring vessel externally threaded at one end, a threaded collar and lock nut for mounting the vessel in the vehicle, a container within the armoring vessel and a lock mounted thereon and having locking engagement with the armoring vessel.

2. A record container for automotive vehicles, comprising an armoring vessel externally threaded at one end, a threaded collar and lock nut for mounting the vessel in the vehicle, a container within the armoring vessel and a lock mounted thereon having a flange, said lock having engagement with the armoring vessel, said flange adapted to enclose the collar in the locked position.

3. A record container for automotive vehicles, comprising an armoring vessel externally threaded at one end, a threaded collar and lock nut on the threaded portion of the vessel for mounting the same, a hollow container having a lock mounted on one end thereof adapted to fit in the armoring vessel and having locking engagement therewith, and a flange on the lock surrounding the collar in the locked position.

4. A safe for automotive vehicles including in combination, an armoring housing having an imperforate cylindrical portion, means for mounting said housing on the vehicle, a removable container adapted to fit within said housing, and means for locking said container to said housing.

5. A safe for automotive vehicles including in combination, an armoring housing, and means for mounting said housing on a vehicle, a container adapted to fit within said housing and a lock mounted on said container for co-action with said housing to lock said container to said housing.

In testimony whereof I affix my signature.

IRA E. DUGAN.